United States Patent
Young et al.

(10) Patent No.: US 10,427,792 B1
(45) Date of Patent: Oct. 1, 2019

(54) VEHICLE WITH A SIMULATED WINDOW FEATURE

(71) Applicant: The Boeing Company, Chicago, IL (US)

(72) Inventors: Stephen M. Young, Mill Creek, WA (US); Darren C. McIntosh, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/942,526

(22) Filed: Apr. 1, 2018

(51) Int. Cl.
| | |
|---|---|
| *G06F 17/00* | (2019.01) |
| *B64D 11/02* | (2006.01) |
| *G09G 5/10* | (2006.01) |
| *B64D 11/00* | (2006.01) |
| *H04N 5/232* | (2006.01) |

(52) U.S. Cl.
CPC .......... *B64D 11/02* (2013.01); *B64D 11/0015* (2013.01); *G09G 5/10* (2013.01); *B64D 2011/0061* (2013.01); *G09G 2320/0626* (2013.01); *G09G 2380/12* (2013.01); *H04N 5/23293* (2013.01)

(58) Field of Classification Search
CPC ... G09F 13/04; G09F 9/35; G09F 7/00; B64D 11/0015; B64D 11/02; G02B 6/0088; H04N 13/279; B64C 1/1492
USPC ............ 244/129.3, 118.5; 348/169; 362/611; 40/542, 718; 701/45
See application file for complete search history.

(56) References Cited

U.S. PATENT DOCUMENTS

| | | | | |
|---|---|---|---|---|
| 3,978,599 | A * | 9/1976 | Berger | .................... G09F 13/04 40/542 |
| 2003/0131513 | A1* | 7/2003 | Runge | ....................... G09F 7/00 40/718 |
| 2008/0169381 | A1* | 7/2008 | Ostrem | ................. B64C 1/1492 244/129.3 |
| 2008/0259433 | A1 | 10/2008 | Weidner | |
| 2009/0112407 | A1* | 4/2009 | Kneller | .............. B64D 11/0015 701/45 |
| 2010/0157063 | A1* | 6/2010 | Basso | ....................... G09F 9/35 348/169 |

(Continued)

FOREIGN PATENT DOCUMENTS

EP 0 913 325 A1 5/1999

OTHER PUBLICATIONS

Szondy, David, "Airbus patents windowless cockpit that would increase pilots' field of view," Newatlas.com; dated Jul. 6, 2014, 3 pages; https://newatlas.com/windowless-cockpit-airbus/32816/.

(Continued)

*Primary Examiner* — Abdul-Samad A Adediran
(74) *Attorney, Agent, or Firm* — McDonnell Boehnen Hulbert & Berghoff LLP

(57) ABSTRACT

An example of operating a display system of a lavatory of a vehicle is provided. The method includes: (i) receiving, at a controller, information indicating that the lavatory is in use; (ii) in response to receiving the information, operating, by the controller, the display system in a first state while the lavatory is in use; (iii) determining, by the controller, that the lavatory is no longer in use; and (iv) in response to determining that the lavatory is no longer in use, operating, by the controller, the display system in a second state.

21 Claims, 7 Drawing Sheets

(56) References Cited

U.S. PATENT DOCUMENTS

| | | |
|---|---|---|
| 2010/0188506 A1 | 7/2010 | Dwyer et al. |
| 2013/0169807 A1 | 7/2013 | de Carvalho et al. |
| 2014/0180508 A1 | 6/2014 | Zaneboni et al. |
| 2014/0353425 A1* | 12/2014 | Boren, Jr. ............. B64D 11/02 244/118.5 |
| 2015/0355405 A1* | 12/2015 | Gentile ............... G02B 6/0088 362/611 |
| 2017/0057660 A1 | 3/2017 | Badger et al. |
| 2017/0094167 A1 | 3/2017 | Riedel |
| 2017/0129607 A1 | 5/2017 | Grant |
| 2017/0296687 A1 | 10/2017 | Hatta et al. |
| 2018/0068170 A1* | 3/2018 | Kohlmeier-Beckmann ................. H04N 13/279 |

OTHER PUBLICATIONS

NBCNews Article entitled, "Supersonic Jet Ditching Windows for Display Screens" NBCNews.com, dated Apr. 2, 2014, 6 pages; https://www.nbcnews.com/business/travel/supersonic-jet-ditching-windows-display-screens-n66446.

Myf Warhurst, "The windowless plane will squeeze the last drops of joy out of air travel," The Guardian, dated Oct. 28, 2014, 3 pages; https://www.theguardian.com/lifeandstyle/2014/oct/29/the-windowless-plane-will-squeeze-the-last-drops-of-joy-out-of-air-travel.

"No Windows? No Problem! Virtual Windows by Winscape," Twistedsifer.com, dated Apr. 19, 2010, 8 pages; http://twistedsifter.com/2010/04/winscape-virtual-windows/.

Extended European Search Report prepared by the European Patent Office in application No. EP 19 16 6379.8 dated Jul. 22, 2019.

\* cited by examiner

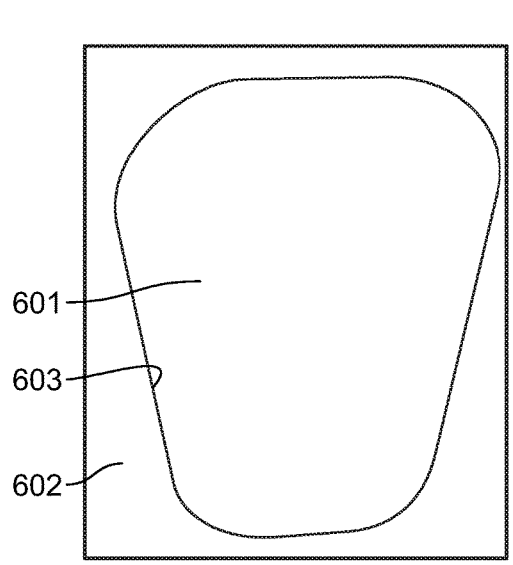
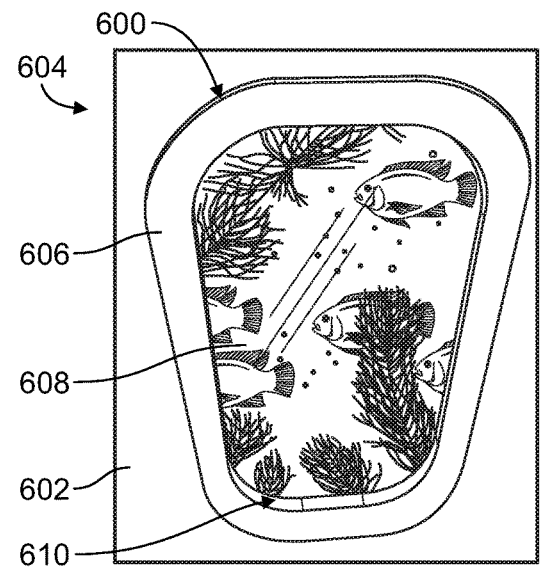
FIG. 6  FIG. 6A
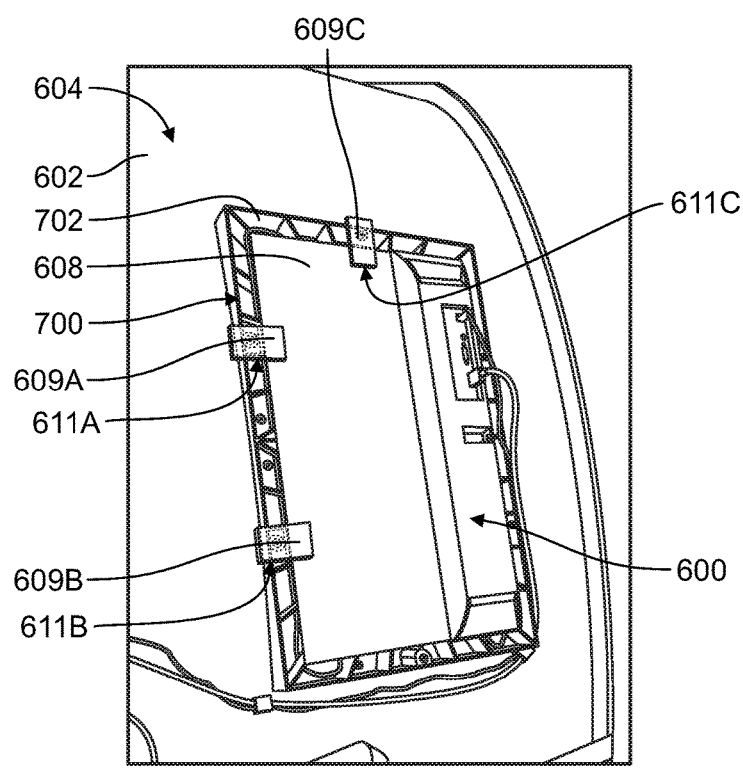
FIG. 7

US 10,427,792 B1

VEHICLE WITH A SIMULATED WINDOW FEATURE

FIELD

The present disclosure relates generally to a display system for a vehicle such as an aircraft. In further examples, methods and systems for simulating presence of a window via the display system are provided.

BACKGROUND

Commercial aircraft set up for the transportation of passengers typically include rows of seats along the length of the aircraft cabin that are separated by an aisle, at least one galley in the cabin, and one or more lavatories in the cabin. Because the primary purpose of a commercial aircraft is to transport passengers, the aircraft cabin is usually set up to maximize the number of seats in the cabin. As a result, it is challenging to provide adequate lavatory space without reducing seat count.

A typical passenger aircraft includes at least one lavatory enclosure that is positioned along a central aisle of the aircraft among the rows of seats. The lavatory enclosure is accessed through a doorway from the central aisle. The width of the lavatory enclosure is typically not much larger than the width of the doorway. In some cases, the available space within a lavatory is limited. In these cases, even with the best of designs, the lavatory can still feel confining to the user.

It is with respect to these and other considerations that the disclosure made herein is presented.

SUMMARY

The present disclosure describes examples that relate to a vehicle with a simulated window feature.

In one aspect, the present disclosure describes a display system for a vehicle. The display system includes: (i) a bezel disposed in a wall; (ii) a semi-transparent sheet surrounded by the bezel; (iii) an opaque back plate surrounded by the bezel and offset from the semi-transparent sheet; and (iv) a light source disposed between the semi-transparent sheet and the opaque back plate.

In another aspect, the present disclosure describes a display system for a lavatory of a vehicle. The display system is configured to resemble a window of the vehicle and includes: (i) a bezel disposed in a wall of the lavatory; (ii) a fixture mounted to the wall of the lavatory; and (iii) an electronic display mounted in the fixture, such that the electronic display is visible from within the lavatory through the bezel.

In another aspect, the present disclosure describes a method of operating a display system of a lavatory of a vehicle. The display system is configured to resemble a window of the vehicle, and the method includes: (i) receiving, at a controller, information indicating that the lavatory is in use; (ii) in response to receiving the information, operating, by the controller, the display system in a first state while the lavatory is in use; (iii) determining, by the controller, that the lavatory is no longer in use; and (iv) in response to determining that the lavatory is no longer in use, operating, by the controller, the display system in a second state.

In another aspect, the present disclosure describes a method of making a simulated window feature in a lavatory of a vehicle. The method includes: (i) forming a cutout in a curved wall of the lavatory, wherein the cutout is oval- or oblong-shaped; (ii) installing a bezel about a boundary of the cutout; and (iv) installing a display system, such that the display system is visible from within the lavatory.

In another aspect, the present disclosure describes an aircraft. The aircraft includes: (i) a lavatory having a curved wall, wherein a cutout is formed in the curved wall of the lavatory; a bezel disposed about a boundary of the cutout; and (iii) a display system coupled to the bezel, such that the display system is visible from within the lavatory.

The foregoing summary is illustrative only and is not intended to be in any way limiting. In addition to the illustrative aspects, examples, and features described above, further aspects, examples, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 6 illustrates a cutout in an outboard wall of a lavatory, in accordance with an example implementation.

FIG. 6A illustrates a frontal view of a display system integrated in an outboard wall of a lavatory, in accordance with an example implementation.

FIG. 7 illustrates a posterior view of the display system shown in FIG. 6A, in accordance with an example implementation.

DETAILED DESCRIPTION

The description provided below uses an aircraft as an example vehicle for illustration purposes. However, the description is applicable to lavatories of other vehicles, such as buses, trains, boats, ships, submarines, space vehicles, etc.

One consideration in configuring a lavatory of an aircraft is to maximize the appearance of space within the lavatory. Maximizing appearance of space can be accomplished by minimizing intrusions into the space, using lighting techniques, and by strategically utilizing mirrored and curved surfaces. In some cases, e.g., in a lavatory at a front left hand side of an aircraft, the available space is limited due to the limited space available for the lavatory. In these cases, even with the above-mentioned techniques to maximize space, the lavatory can still feel confining to the user.

Further, in addition to maximizing perceptions of spaciousness within the lavatory, it may be desirable to maintain a common look and feel throughout the aircraft so that the various areas within the aircraft do not seem disconnected from one another to a passenger. Within examples, disclosed herein are lavatories, systems, and methods for enhancing perception of spaciousness and commonality throughout the aircraft. For example, a lavatory disclosed herein enhances perception of spaciousness by giving the user an impression or simulation of a window feature, e.g., simulates a shape of a window. Such simulated window feature further provides commonality with the cabin outside the lavatory by mirroring the curves and lighting effects utilized in the cabin.

Figure 1:
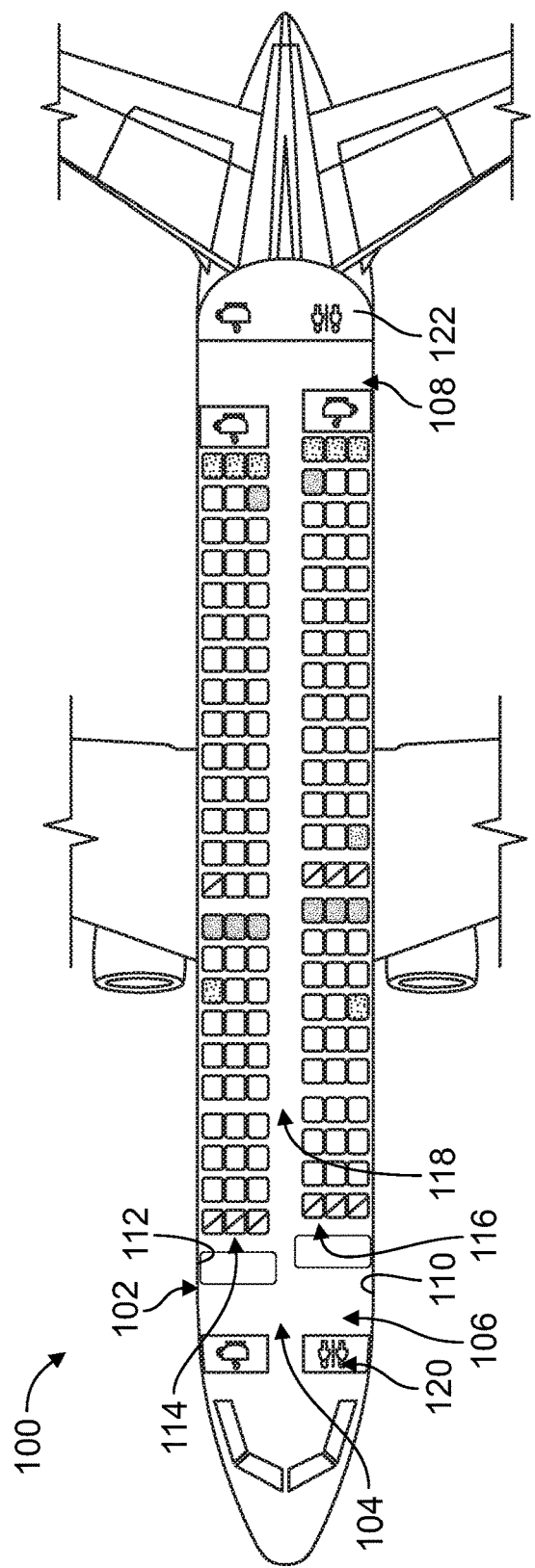
FIG. 1 illustrates a layout of an interior of an aircraft, in accordance with an example implementation.

FIG. 1 illustrates a layout of an interior of an aircraft 100, in accordance with an example implementation. The aircraft 100 has a fuselage or body 102 that surrounds a cabin 104. The cabin 104 has a longitudinal length between a front 106 of the cabin 104 and a rear 108 of the cabin 104. The cabin 104 also has a lateral width between a first interior sidewall 110 and second interior sidewall 112 of the body 102.

A plurality of rows of seats 114, 116 can be arranged on a floor of the cabin 104. The rows of seats 114, 116 can be arranged on laterally opposite sides of the cabin 104 and define a central aisle 118 therebetween. The central aisle 118 can extend longitudinally through the cabin 104 across the floor surface between the front 106 and the rear 108 of the cabin 104 and between the rows of seats 114, 116.

In the example shown in FIG. 1, the aircraft 100 includes two lavatories: a front lavatory 120 and a rear lavatory 122. More or fewer lavatories could be used. Each lavatory 120, 122 is accessible through a respective door from the central aisle 118. The width dimension of each of the lavatories 120, 122 is configured in order to maximize the passenger seating in the cabin 104. The width of each lavatory 120, 122 might thus not be much larger than the width of its respective door. As such, the space within the lavatories 120, 122, and particularly within the front lavatory 120, is limited and the lavatories 120, 122 can feel confining to the user. Disclosed herein are systems that enhance perception of spaciousness within the lavatory and enhance commonality or similarity with the rest of the cabin 104.

Figure 2:
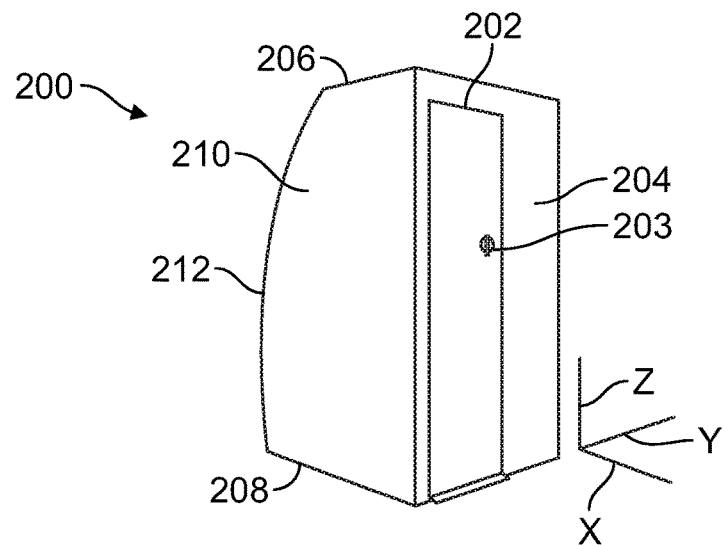
FIG. 2 illustrates a perspective view of an exterior of a lavatory, in accordance with an example implementation.
Figure 3:
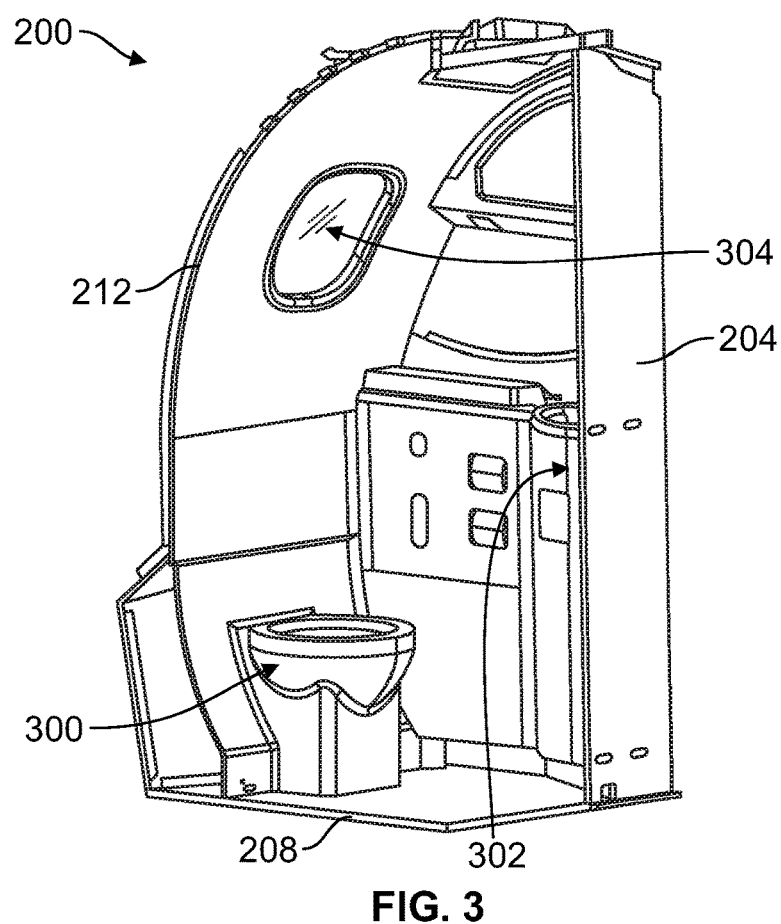
FIG. 3 illustrates a partial perspective view of an interior of the lavatory shown in FIG. 2, in accordance with an example implementation.

FIG. 2 illustrates a perspective view of an exterior of a lavatory 200, and FIG. 3 illustrates a partial perspective view of an interior of the lavatory 200, in accordance with an example implementation. The lavatory 200 can represent either the lavatory 120, or the lavatory 122, for example.

The lavatory 200 generally includes a door 202, a front wall 204, a ceiling or top wall 206, a floor 208, various sidewalls, e.g., sidewall 210, and a curved outboard wall 212. The curved outboard wall 212 is adjacent to a fuselage or the body of the aircraft 100 and is curved to confirm to curvature of the body 102 (e.g., curvature of the fuselage of the aircraft 100). The curved outboard wall 212 can be offset from respective interior sidewalls (e.g., the interior sidewall 110) of the aircraft 100. The lavatory 200 can have any convenient shape, and is not limited to the generally curvilinear implementation shown in FIGS. 2-3.

As shown in FIG. 3, the lavatory 200 generally includes a toilet assembly 300 and a sink assembly 302. The lavatory 200 might include other features which, to reduce visual clutter in the drawing, are not illustrated. The other features may include hand bars, hand grips, projections, platforms, signage, and lighting configured to facilitate an individual's use of the lavatory 200. Various amenities such as toilet paper, soap, paper towels, and the like are conventionally provided (e.g., in an upper mirror cabinet, sink cabinet, sink basin, etc.). The lavatory 200 may also include one or more mirrors or storage areas.

As indicated by FIGS. 2-3, the available space within the lavatory 200 is limited. Further, interiors of conventional lavatories look different from the rest of the cabin 104 of the aircraft 100. For example, while the aircraft 100 includes multiple windows longitudinally-spaced along a length of the aircraft 100, the lavatories typically do not include windows. Therefore, it may be desirable to include a window in the curved outboard wall 212 of the lavatory 200. Such window can generate or elicit a perception of spaciousness within the confining environment of the lavatory and at the same time provide for commonality with the cabin 104.

Configuring the lavatory with a real window similar to the windows disposed in the cabin 104 can involve structural changes. The body 102 of the aircraft 100 is typically designed and configured with a particular number of windows for the cabin 104 and adding a new window can involve structural changes to the design of the body 102. For example, placing a real window in lavatory 200, and particularly in the curved outboard wall 212 of the lavatory 200, can involve adding structural reinforcements around the window. Further, placing a real window in the lavatory 200 can involve aligning the window with other structural features of the body 102. In some cases, it may be desirable to have a feature in the lavatory 200 that simulates or provokes spaciousness within the lavatory 200 and commonality with the rest of the cabin 104, without involving structural changes to the body 102 of the aircraft 100.

As such, as depicted in FIG. 3, the lavatory 200 can have a cutout in the curved outboard wall 212 to house a display system 304 configured as a simulated window feature. The display system 304 can elicit a perception of spaciousness within the lavatory 200 by giving the user the impression of a window. At the same time, the display system 304 mimics a standard window used in the cabin 104, and can therefore provide a feeling of commonality with the cabin 104 by mirroring the curves and lighting effects utilized in the cabin 104.

Figure 4:
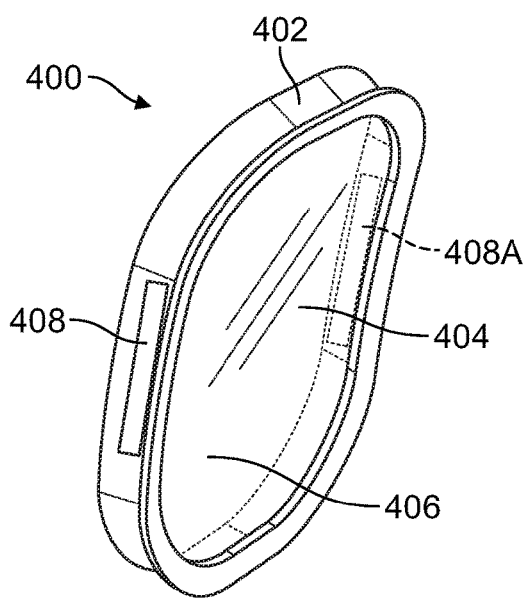
FIG. 4 illustrates a display system, in accordance with an example implementation.

FIG. 4 illustrates a display system 400, in accordance with an example implementation. The display system 400 can represent the display system 304, for example. The display system 400 includes a bezel 402. The bezel 402 can, for example, mimic similar bezels used for, or simulate the shape of, standard windows in the cabin 104. The bezel 402 can be configured as an oval- or oblong-shaped ring holding, securing, or retaining other components of the display system 400.

The display system 400 can also include a semi-transparent sheet 404 disposed at an anterior side of the display system 400 (e.g., side facing toward inside space of the lavatory 200). The semi-transparent sheet 404 can be made of a translucent material configured to permit, at least partially, the passage of light. In examples, the semi-transparent sheet 404 could be made of a thermoplastic sheet that is compliant with fire, smoke, and toxicity guidelines for aircraft manufacturing. Example materials for the semi-transparent sheet 404 that conform to standard of aircraft manufacturing include: thermoplastic acrylic-polyvinyl chloride sheeting; polycarbonate sheeting; amorphous thermoplastic polyetherimide sheeting; Dupont® Corian® Illumination Series translucent sheeting; Aristech Avonite®; Formica® group solid surfacing; Hanwha Hanex®; Kerrock® Kolpa; Krion® Porcelanosa® solid surface; Staron®; Meganite®; Swan Swanstone; and Wilsonart® solid surface.

The display system 400 can further include an opaque back plate 406 disposed at a posterior side of the display system 400 (e.g., the side of the display system 400 that is aligned with the curved outboard wall 212 and is closer to an interior sidewall, such as the interior sidewall 110, of the aircraft 100). The opaque back plate 406 can be made of aluminum, a polycarbonate material, or other opaque materials. For example, the opaque back plate 406 can be made of ULTEM® material, which is a thermoplastic material suitable for fire, smoke, and toxicity guidelines for aircraft manufacturing. The opaque back plate 406 is configured to be resistant to transmission of light therethrough, and is thus configured to reduce or preclude light leakage.

The semi-transparent sheet 404 and the opaque back plate 406 can both be made from compliant or bendable material. With this configuration, the semi-transparent sheet 404 and the opaque back plate 406 can conform to a curvature of the curved outboard wall 212 of the lavatory 200.

The display system 400 can further include a light source 408. The light source 408 can be disposed along a side of the bezel 402 and is configured to emit light in a space interposed between the semi-transparent sheet 404 and the opaque back plate 406. The light source 408 can also be disposed along the other side of the bezel 402, a top, or bottom of the bezel 402, or along a perimeter of the bezel 402, depending on a configuration of the light source 408. The light emitted from the light source 408 in the space interposed between the semi-transparent sheet 404 and the opaque back plate 406 can cause the display system 400 to glow and generate a perception of spaciousness.

In an example, the light source 408 can be triggered to emit light or increase the amount of light by a particular event. For instance, the light source 408 can be configured to emit no or a small amount of (e.g., dim) light as long as the lavatory 200 is not in use. Once a user enters the lavatory 200 and locks the door 202, which could be sensed by a deadbolt sensor 203 in the door 202, the light source 408 can be triggered to emit more light to operate as a light source within the lavatory 200 and at the same time elicit a perception of spaciousness within the lavatory 200.

Further, the display system 400 can be configured or tailored to mimic the look and feel of standard windows in the cabin 104. As an example, a standard window can have a bluish glow around an edge of an oval- or oblong-shaped bezel. The display system 400 can be configured similarly by having the light source 408 provide a bluish glow around the bezel 402 to provide for commonality with the standard windows outside the lavatory 200.

The light source 408 can generally include any type of an electromagnetic radiation source. The electromagnetic radiation source can be configured to project light of any wavelength, visible or invisible. For example, the electromagnetic radiation source may be configured as a lamp or light emitting diode (LED) to project visible light with different colors. Additionally or alternately, the light source 408 or a secondary light source 408A can be configured to project invisible light such as ultraviolet or infrared light. In the case where the light source 408 or the secondary light source 408A emits invisible light, the semi-transparent sheet 404 can be configured to interact with the invisible light to generate a particular visible pattern. In some examples, the light source 408 can include multiple LEDs, or be configured as a string of LEDs.

As an example, a pattern (e.g., pattern of the scene 500 described below) can be printed on the semi-transparent sheet 404 using ultraviolet (UV)-sensitive ink. Such pattern might not be visible to the user if visible light is projected on the pattern. However, once UV light is projected or emitted from the light source 408 onto the semi-transparent sheet 404, the UV-sensitive ink is activated and the pattern glows and becomes visible to the user of the lavatory 200. Additionally or alternatively, infrared (IR)-sensitive inks can be used to print particular patterns on the semi-transparent sheet 404. Such IR-sensitive inks can be activated and the pattern printed thereon using the IR-sensitive inks can glow and become visible to the user when subjected to IR light from the light source 408 or the secondary light source 408A.

Figure 4A:
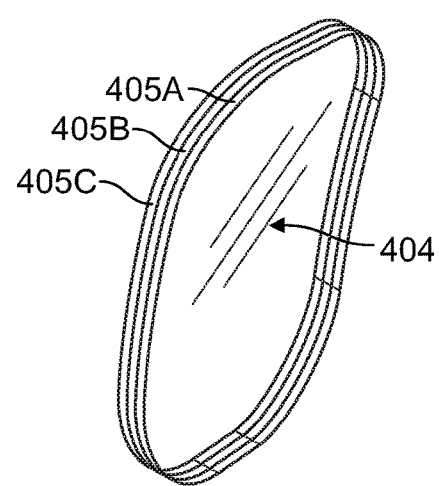
FIG. 4A illustrates a semi-transparent sheet having a plurality of layers, in accordance with an example implementation

Additionally or alternatively, the semi-transparent sheet 404 can include multiple or a plurality of layers, each layer having a respective pattern printed thereon. FIG. 4A illustrates the semi-transparent sheet 404 having a plurality of layers, in accordance with an example implementation. In the example implementation of FIG. 4A, the semi-transparent sheet 404 includes multiple layers, such as layers 405A, 405B, 405C. Each respective pattern can be activated to glow and become visible when a particular type of light or wavelength is projected thereon. For instance, different patterns could be triggered by IR light or a particular wavelength of IR light, others could be triggered by UV light or a particular wavelength of UV light. As such, the light source 408 can be configured to emit UV or IR light to selectively cause a particular pattern of respective patterns of the multiple layers 405A, 405B, 405C to be visible. With this configuration, the display system 400 can have or can be used to display different aesthetic states. As an example for illustration, when one type of light or a particular wavelength of light is projected from the light source 408, a particular logo (e.g., airline manufacturer logo) glows. When a different type of light or wavelength of light is projected from the light source 408, a different logo (e.g., airliner logo) glows.

Other visual effects can be achieved by printing graphics or images on the semi-transparent sheet 404 (or the multiple layers comprised therein). For example, printed graphics can create the illusion of looking outside the aircraft 100.

In the example where the display system 400 is used in an aircraft (e.g., the aircraft 100), the display system 400 is configured to withstand operating conditions of the aircraft. For instance, aircraft are subjected to temperature variations in the cabin during various flight phases of the aircraft. For example, the temperature at ground level might be different than the temperature at cruise altitude. Also, the aircraft is subjected to different pressurization levels within the cabin during the various flight phases. Further, the aircraft can be subjected to high level of vibrations during flight. Materials for components of the display system 400 are selected so as to withstand such operating conditions.

Figure 5:
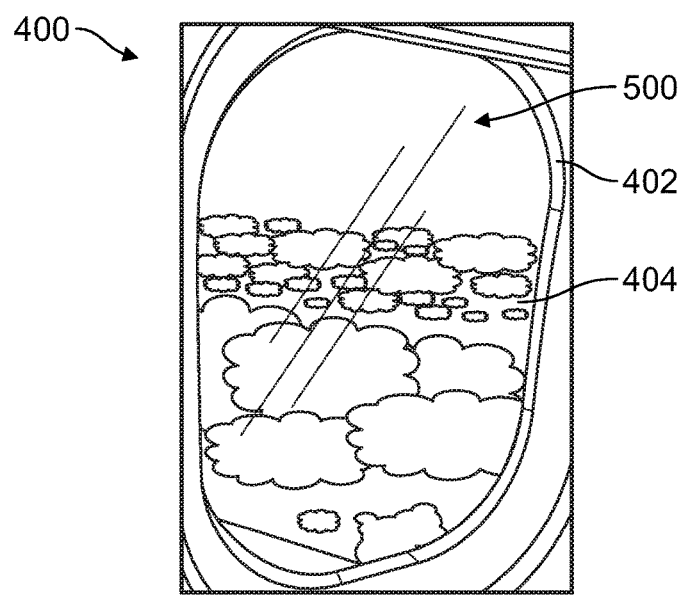
FIG. 5 illustrates the display system in FIG. 4 simulating a scene from an external environment of an aircraft, in accordance with an example implementation.

FIG. 5 illustrates the display system 400 simulating a scene 500 from an external environment of the aircraft 100, in accordance with an example implementation. The scene 500 printed on the semi-transparent sheet 404 or multiple layers thereof includes a graphical representation of clouds, the sky, and a portion of a wing of the plane so as to simulate the environment of the aircraft 100. Different layers of semi-transparent sheet 404 can portray the scene in a respective particular state. By triggering the layers sequentially or cyclically (e.g., by emitting lights of respective wavelengths or different types of light sequentially over a period of time) an illusion that the scene is changing (e.g., clouds are moving) can be generated. Users of the lavatory 200 may thus feel that they are looking from a standard window outside the aircraft 100, and may perceive the lavatory 200 to be more spacious.

As such, the display system 400 can be configured as a display system that shows different images, patterns, logos, etc. over time or based on a state of the lavatory 200 (e.g., whether the lavatory 200 is used or not). The display system 400 creates the illusion of additional space within a constricted lavatory, and can also provide for uniformity or commonality with other portions of the cabin 104.

In addition or alternative to using a semi-transparent sheet, the display system can be configured with a display device. For instance, the display system can be configured with an electronic display (e.g., a screen) for presentation of images, text, or video transmitted electronically thereto. Example electronic displays include television sets, computer monitors, tablet computers, smartphones, etc.

FIG. 6 illustrates a cutout 601 in an outboard wall 602 of a lavatory 604, FIG. 6A illustrates a frontal view of a display system 600 integrated in the outboard wall 602, and FIG. 7 illustrates a posterior view of the display system 600, in accordance with an example implementation. The outboard wall 602 can have the cutout 601 having a boundary 603 that is oval- or oblong-shaped. The display system 600 can include a bezel 606 installed about the boundary 603 of the cutout 601. The display system also includes an electronic display 608 that visible from within the lavatory 604.

As shown in FIG. 7, the display system 600 can also include a fixture 700 configured to hold, secure, or retain the electronic display 608. The bezel 606 can be configured as ring-shaped and particularly oval- or oblong-shaped ring that is characteristic of windows of an aircraft or other vehicles. The electronic display 608, however, might not have the same shape as the bezel 606. As such, the fixture 700 is configured to have a cutout that matches a geometric shape of the electronic display 608. For instance, as shown in FIG. 7, the electronic display 608 is rectangular in shape, and the fixture 700 has a rectangular cutout to accommodate the electronic display 608. Plates, such as plates 609A, 609B, 609C can be fastened to the fixture 700 (e.g., through screws) and are configured to retain the electronic display 608 while pushing the electronic display 608 toward the bezel 606. Foam pieces 611A, 611B, 611C can be interposed between the plates 609A, 609B, 609C and the electronic display 608 to preclude damage to the electronic display 608.

Both the fixture 700 and the electronic display 608 mounted therein are disposed behind the bezel 606. As a result, despite the rectangular shape of the electronic display 608, a user of the lavatory 604 might see an oval- or oblong-shaped display as shown in the frontal view of FIG. 6, while other fringe or peripheral portions of the electronic display 608 are blocked.

The fixture 700 can have a variable thickness to accommodate the curvature of the outboard wall 602. As depicted shown in FIG. 7, the fixture 700 has large thicknesses at the top and bottom edges of the fixture 700, whereas the fixture 700 has a smaller thickness at the middle section thereof. This way, the fixture 700 conforms to the curvature of the outboard wall 602.

The electronic display 608 can be configured as an active or a passive display. In the case of an active display, the electronic display 608 can present visual information according to an electrical input signal (analog or digital) by emitting light. In the case of a passive display, the electronic display 608 can be configured to present the visual information by modulating available light during the process of reflection or transmission, and in this case the electronic display 608 can be referred to as a light modulator.

Example electronic displays include liquid crystal display (LCD) such as LCD television screens, and LCD computer monitors; cathode ray tube (CRT) display; field emission display (FED); vacuum fluorescent display (VFD); surface-conduction electron-emitter display (SED); thin or thick film electro luminescence (EL) display; inorganic light emitting diode (LED) or organic LED (OLED); gas discharge display; and plasma display panel (PDP). An electronic display of any of these types or other types can beneficially be readily replaceable for maintenance purposes of the display system 600.

An OLED display can be bendable or compliant, and thus if the electronic display 608 is configured as an OLED display, the electronic display 608 can conform to curvature or contour of the outboard wall 602 of the lavatory 604. In other implementations, the electronic display 608 might not be bendable. In these implementations, the display system 600 can include an adapter 610 disposed between the bezel 606 and the electronic display 608. The adapter 610 is configured as an oval- or oblong-shaped ring and is configured to accommodate the varying distance between the electronic display 608, which is flat, and the bezel 606 or the outboard wall 602, which is curved.

Figure 8:
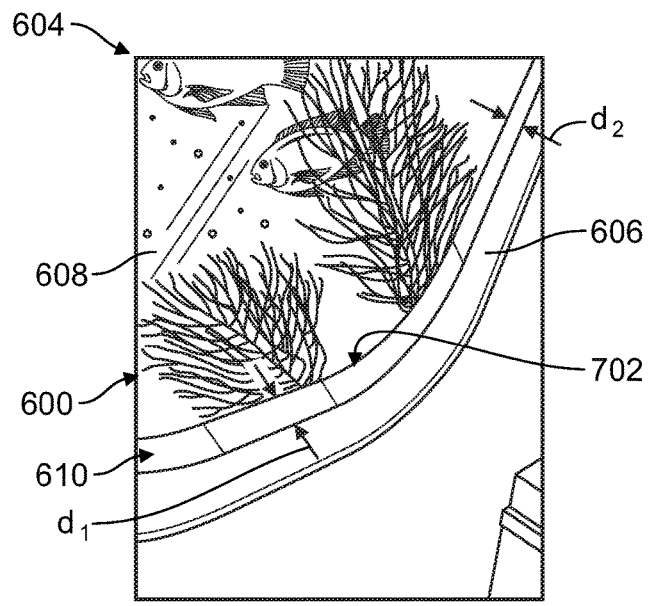
FIG. 8 illustrates a zoomed-in partial frontal view of the display system shown in FIGS. 6A and 7, in accordance to an example implementation.

FIG. 8 illustrates a zoomed-in partial frontal view of the display system 600, in accordance with an example implementation. As depicted in FIG. 8, the adapter 610 has a variable thickness. For instance, while the adapter 610 has a larger thickness "$d_1$" at a bottom (and top) edge thereof, the adapter 610 has smaller thickness "$d_2$" along its side edges, and particularly at the middle section of the side edges. With this configuration, the adapter 610 is interposed between and interfaces with the electronic display 608 and the bezel 606 or the outboard wall 602, and accommodates the varying distance between the electronic display 608 (which is flat) and the bezel 606 or the outboard wall 602 (which is curved). As such, the adapter 610 effectively converts a curved contour of the outboard wall 602 to a planar or flat surface that interfaces with the electronic display 608. The adapter 610 can be made of a variety of materials such as ULTEM®, polycarbonate, or other plastic materials suitable for use within an aircraft, for example.

As shown in FIGS. 6-8, the electronic display 608 can be flat, whereas the outboard wall 602 is curved. Also, the electronic display 608 might not be oval- or oblong-shaped like the bezel 606, but can extend beyond boundaries of the bezel 606. As such, light leakage can occur around edges of the bezel 606. The bezel 606 and the adapter 610 can be made of an opaque material to reduce light leakage around the edges of the bezel 606. Further, the display system 600 can have an opaque layer 702 (depicted in FIGS. 7 and 8) that is interposed between edges of the electronic display 608 and respective edges of the bezel 606 or the adapter 610 so as to reduce or preclude light leakage around the edges of the bezel 606.

The opaque layer 702 can be made of a polymer material. For example, the opaque layer 702 can be made of a polyvinyl fluoride film (PVF) or other polymers that have low flammability and suitable for an environment of an aircraft.

The electronic display 608 can display videos, images, logos, text, etc. For instance, the electronic display 608 can display a video from inside an aquarium as depicted in FIGS. 6 and 8. Any other videos, graphics, or images could be displayed to elicit a perception of spaciousness within the lavatory 604.

In examples, the aircraft 100 can be configured to have an image-capture device, e.g., a camera, disposed outside the aircraft 100 and configured to capture images or videos of the external environment of the aircraft 100. The images, videos, or live feed captured by such camera can be input to the electronic display 608 and displayed thereon. A user of the lavatory 604 can thus see the external environment of the aircraft 100.

The camera can be integrated behind (e.g., outboard from) the display system 600 and can thus be a part of an assembly package of the display system 600. For instance, the camera can operate via a small diameter hole (e.g., pin hole or key hole) in the fuselage of the aircraft 100 and sealed with a lens. The camera can be communicatively coupled via a hard wire or Wi-Fi communication and can be configured to transmit live images to the electronic display 608. An occupant or user of the lavatory 604 can then see an external environment of the aircraft as if the display system 600 represents a real window disposed at the location of the display system 600. Lavatories located on the left hand side of the vehicle can receive different images from those on the right hand side of the vehicle. Thus, a lavatory on the left side of the vehicle can show images depicting movement of travel, sunrise, sunset, and scenery, etc. that are different from images shown in a lavatory on the right hand side of the vehicle. With this configuration, the camera provides the users of the lavatory with the perception that they are looking through a real window from a specific perspective inside the lavatory 604.

Components of the display system 600 (e.g., electronics of a controller thereof and of the electronic display 608) are configured to withstand operating conditions of the aircraft that involve fluctuations in temperature and pressure, as well as vibrations during various flight phases. Components of the display system 600 (e.g., electronics of a controller thereof and of the electronic display 608) can also be configured with Electronic Magnetic Interference (EMI) shielding.

Figure 9:
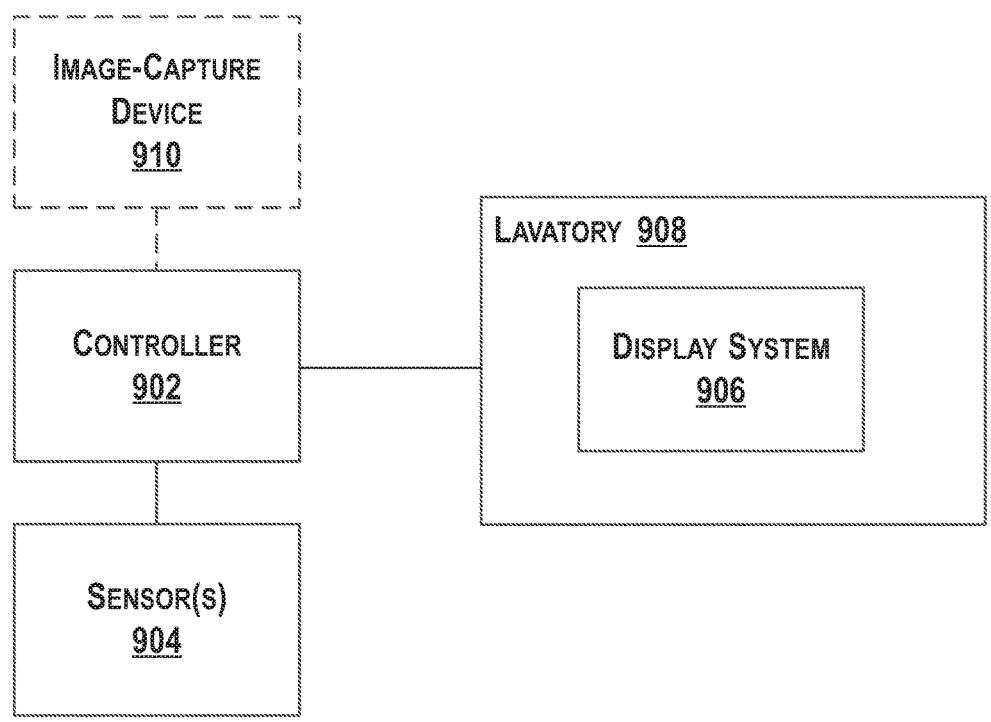
FIG. 9 illustrates a block diagram of a system, in accordance with an example implementation.

FIG. 9 illustrates a block diagram of a system 900, in accordance with an example implementation. The system 900 can be a system for operating a display system (e.g., the display system 400 or 600) of a lavatory (e.g., the lavatory 200 or 604) of a vehicle (e.g., the aircraft 100), for example.

The system 900 includes a controller 902 coupled to sensor(s) 904. The controller 902 can be configured to operate a display system 906 of a lavatory 908. The display system 906 can represent the display system 400 or 600, and the lavatory 908 can represent the lavatory 200 or 604.

The controller 902 can receive outputs from the sensor(s) 904 to determine when to operate the display system 906. As an example, the sensor(s) 904 can include a deadbolt sensor (e.g., the deadbolt sensor 203) of the door of the lavatory 908. The controller 902 can receive from such a deadbolt sensor information indicating that the lavatory 908 is in use (e.g., the door is locked). In response, the controller may operate the display system 906 in a first state (e.g., turn the display system on). For instance, the display system 906 can include a light source (e.g., the light source 408) and the controller 902 can trigger or activate the light source to operate the display system 906 in the first state.

In another example, the display system 906 can include an electronic display (e.g., the electronic display 608) and the controller 902 can generate a display of an image or a video on the electronic display to operate the display system 906 in the first state. The vehicle (e.g., an aircraft) can include an image-capture device 910 mounted to the vehicle and configured to capture images or a video of an external environment of the vehicle. The electronic display can be configured to display the image or the video. Particularly, the controller 902 can cause the electronic display to display the images or the video captured by the image-capture device 910 to operate the display system 906 in the first state.

After using the lavatory 908, the user then opens a door of the lavatory 908 to leave the lavatory 908, and the controller 902 can determine that the lavatory 908 is no longer in use. For instance, the deadbolt sensor can indicate to the controller 902 that the door of the lavatory 908 is unlocked. In response, the controller 902 can operate the display system 906 in a second state. For instance, the display system 906 can include a light source (e.g., the light source 408) and the controller 902 can dim, turn off, or change type or wavelength of light emitted from the light source. In the example where the display system 906 includes an electronic display (e.g., the electronic display 608), the controller 902 can turn off the electronic display or change the display images, video, text, or graphics.

Figure 10:
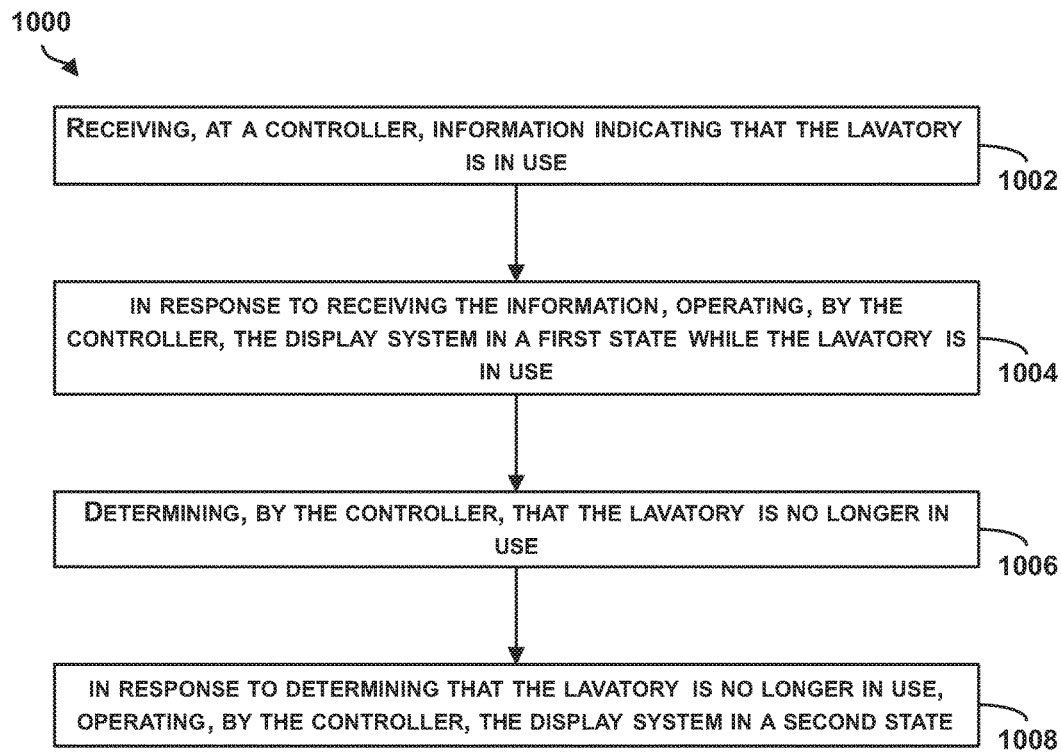
FIG. 10 is a flowchart of a method for operating a display system of a lavatory of a vehicle, in accordance with an example implementation.

FIG. 10 is a flowchart of a method 1000 for operating a display system of a lavatory of a vehicle, in accordance with an example implementation. The method 1000 presents an example of a method that can be implemented by the controller 902, for example. Further, FIGS. 11-14 are flowcharts of methods for use with the method 1000.

The method 1000 may include one or more operations, or actions as illustrated by one or more of blocks 1002-1016. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 1000 and other processes and operations disclosed herein, the flowchart shows operation of one possible implementation of present examples. In this regard, each block may represent a module, a segment, or a portion of program code, which includes one or more instructions executable by a processor or a controller (e.g., the controller 902) for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 1000 and other processes and operations disclosed herein, one or more blocks in FIGS. 10-14 may represent circuitry or digital logic that is arranged to perform the specific logical operations in the process.

At block 1002, the method 1000 includes receiving, at the controller 902, information indicating that the lavatory 908 is in use.

At block 1004, the method 1000 includes, in response to receiving the information, operating, by the controller 902, the display system 906 in a first state while the lavatory 908 is in use.

At block 1006, the method 1000 includes determining, by the controller 902, that the lavatory 908 is no longer in use.

At block 1008, the method 1000 includes, in response to determining that the lavatory 908 is no longer in use, operating, by the controller 902, the display system 906 in a second state.

Figure 11:
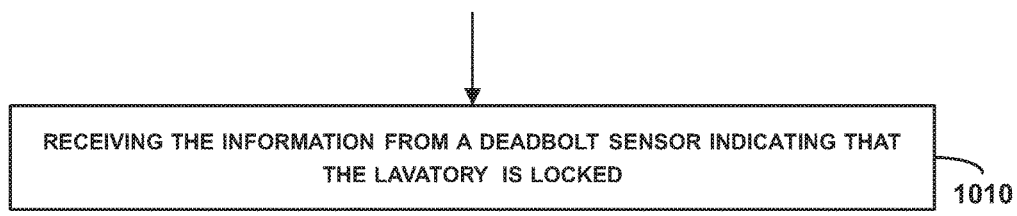
FIG. 11 is a flowchart of additional operations that may be performed with the method of FIG. 10, in accordance with an example implementation.

FIG. 11 is a flowchart of additional operations that can be executed and performed with the method 1000, in accordance with an example implementation. The controller 902 can be in communication with the sensor(s) 904. For instance, the sensor(s) 904 can include a deadbolt sensor coupled to a lock of a door of the lavatory 908. At block 1010, operations include receiving the information (indicating that the lavatory 908 is in use) from a deadbolt sensor indicating that the lavatory 908 is locked.

Figure 12:
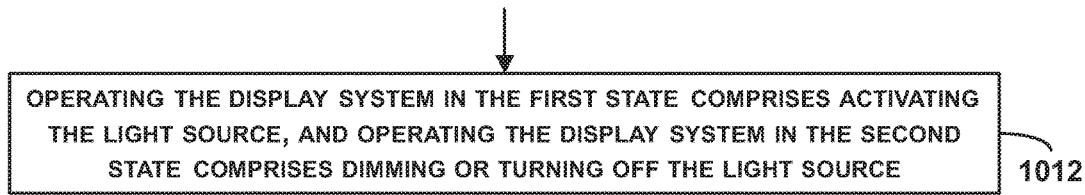
FIG. 12 is a flowchart of additional operations that may be performed with the method of FIG. 10, in accordance with an example implementation.

FIG. 12 is a flowchart of additional operations that can be executed and performed with the method 1000, in accordance with an example implementation. The display system 906 can represent the display system 400 and can include the light source 408. At block 1012, operations include activating the light source 408 to operate the display system 906 in the first state, and dimming or turning off the light source 408 to operate the display system 906 in the second state.

Figure 13:
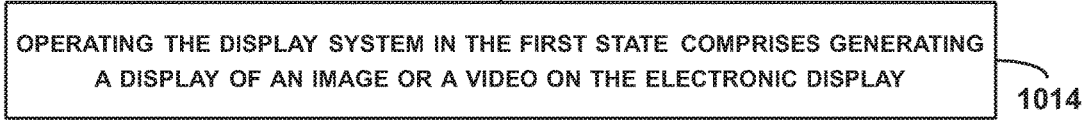
FIG. 13 is a flowchart of additional operations that may be performed with the method of FIG. 10, in accordance with an example implementation.

FIG. 13 is a flowchart of additional operations that can be executed and performed with the method 1000, in accordance with an example implementation. The display system 906 can represent the display system 600 and can include the electronic display 608. At block 1014, operations include generating a display of an image or a video on the electronic display 608 to operate the display system in the first state.

Figure 14:
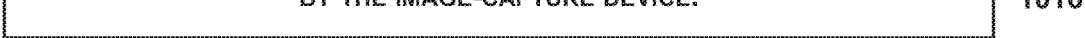
FIG. 14 is a flowchart of additional operations that may be performed with the method of FIG. 10, in accordance with an example implementation.

FIG. 14 is a flowchart of additional operations that may be executed and performed with the method 1000, in accordance with an example implementation. The vehicle can be an aircraft, such as the aircraft 100, and the aircraft can include the image-capture device 910 mounted to the aircraft and configured to capture images or a video of an external environment of the aircraft. At block 1016, operations include causing the electronic display 608 to display the images or the video captured by the image-capture device 910 to operate the display system 906 in the first state comprises.

Figure 15:
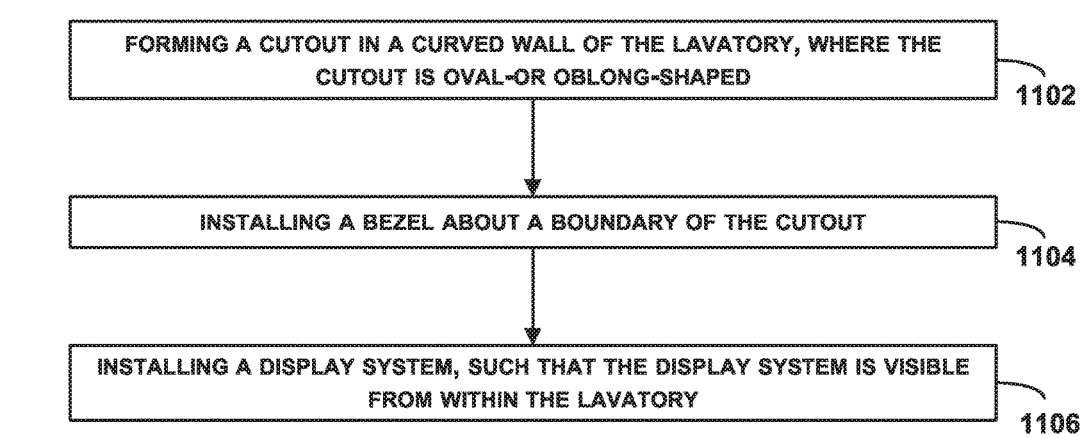
FIG. 15 is a flowchart of a method for installing a display system in a lavatory, in accordance with an example implementation.

FIG. 15 is a flowchart of a method 1100 for installing a display system in a lavatory, in accordance with an example implementation. The method 1100 presents an example of making a simulated window feature in a lavatory of a vehicle, for example. The method 1100 may include one or more operations, functions, or actions as illustrated by one or more of blocks 1102-1106. Although the blocks are illustrated in a sequential order, these blocks can also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art At block 1102, the method 1100 includes forming a cutout (e.g., the cutout 601) in the curved wall (e.g., the curved outboard wall 212 or outboard wall 602) of the lavatory 200 or 604. The cutout is oval- or oblong-shaped to resemble a standard window of an aircraft, for example.

At block 1104, the method 1100 includes installing a bezel 402 or 606 about a boundary (e.g., the boundary 603) of the cutout.

At block 1106, the method 1100 includes installing a display system 400 or 600, such that the display system 400 or 600 is visible from within the lavatory 200 or 604.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A display system for a vehicle, the display system comprising:
    a bezel disposed about a boundary of a cutout formed in a first wall of a lavatory of the vehicle, wherein a door of the lavatory is formed in a second wall different from the first wall;
    a semi-transparent sheet surrounded by the bezel;
    an opaque back plate surrounded by the bezel and offset from the semi-transparent sheet;
    a first light source disposed on a first side of the bezel between the semi-transparent sheet and the opaque back plate, wherein the first light source is configured to emit light at a first wavelength; and
    a second light source disposed on a second side of the bezel between the semi-transparent sheet and the opaque back plate, wherein the second light source is configured to emit light at a second wavelength.

2. The display system of claim 1, wherein the vehicle is an aircraft, a train, a boat, a ship, a submarine, or a space vehicle, and wherein the display system is configured to resemble a window of the vehicle.

3. The display system of claim 1, wherein the first light source is configured to emit visible light.

4. The display system of claim 1, wherein the semi-transparent sheet comprises a pattern printed thereon, and wherein the second light source is configured to emit light to cause the pattern to be visible.

5. The display system of claim 4, wherein the pattern is printed using ultraviolet- or infrared-sensitive ink, and wherein the second light source is configured to emit ultraviolet or infrared light to cause the pattern to be visible.

6. The display system of claim 4, wherein the pattern comprises a graphical representation of an external environment of the vehicle.

7. The display system of claim 1, wherein the semi-transparent sheet comprises a plurality of layers, wherein each layer of the plurality of layers comprises a respective pattern printed thereon using ultraviolet- or infrared-sensitive ink, and wherein the first light source emits light at the first wavelength whereas the second light source emits light at the second wavelength in a particular sequential pattern, thereby causing respective patterns of the plurality of layers to be visible in a particular sequence, generating a moving scene.

8. The display system of claim 1, wherein the first wall of the lavatory is curved, and wherein the semi-transparent sheet is bendable to accommodate curvature of the first wall of the lavatory.

9. A display system for a lavatory of a vehicle, wherein the display system is configured to resemble a window of the vehicle, the display system comprising:
    a bezel disposed about a boundary of a cutout formed in a wall of the lavatory;
    a fixture configured as a continuous member mounted exterior to the wall of the lavatory behind the bezel; and
    an electronic display mounted in the fixture, such that the electronic display is visible from within the lavatory through the bezel, wherein the wall of the lavatory is curved to match curvature of a body of the vehicle, wherein the electronic display is flat, wherein the fixture is ring-shaped and has variable thickness such that a top edge and a bottom edge of the fixture are thicker than a middle section of the fixture so as to accommodate curvature of the wall of the lavatory.

10. The display system of claim 9, further comprising:
    an adapter disposed between the electronic display and the bezel, wherein the adapter is ring-shaped and has variable thickness so as to accommodate curvature of the wall of the lavatory.

11. The display system of claim 9, further comprising:
    an image-capture device mounted to the vehicle and configured to capture images or a video of an external environment of the vehicle, wherein the electronic display is configured to display the images or the video captured by the image-capture device.

12. The display system of claim 9, further comprising:
    an opaque layer disposed between the electronic display and the bezel so as to reduce light leakage around edges of the bezel.

13. The display system of claim 9, further comprising:
    a controller configured to:
        detect that the lavatory is in use; and
        in response to detecting that the lavatory is in use, operating the electronic display to display images or a video while the lavatory is in use.

14. The display system of claim 9, wherein the electronic display is replaceable for maintenance purposes of the display system.

15. A method of operating a display system of a lavatory of a vehicle, wherein the display system is configured to resemble a window of the vehicle, the method comprising:
    receiving, at a controller, information indicating that the lavatory is in use;
    in response to receiving the information, operating, by the controller, the display system in a first state while the lavatory is in use, wherein the display system comprises (i) a bezel disposed about a boundary of a cutout formed in a wall of the lavatory, (ii) a fixture configured as a continuous member, (iii) and a display mounted in the fixture, such that the display is visible from within the lavatory through the bezel, wherein the wall of the lavatory is curved, wherein the display is flat, wherein the fixture is ring-shaped and has variable thickness such that a top edge and a bottom edge of the fixture are thicker than a middle section of the fixture so as to accommodate curvature of the wall of the lavatory;
    determining, by the controller, that the lavatory is no longer in use; and
    in response to determining that the lavatory is no longer in use, operating, by the controller, the display system in a second state.

16. The method of claim 15, wherein receiving the information comprises:
    receiving the information from a deadbolt sensor indicating that the lavatory is locked.

17. The method of claim 15, wherein the display system comprises a light source, and wherein operating the display system in the first state comprises activating the light source, and wherein operating the display system in the second state comprises dimming or turning off the light source.

18. The method of claim 15, wherein the display comprises an electronic display, and wherein operating the display system in the first state comprises generating a display of an image or a video on the electronic display.

19. The method of claim 18, wherein the vehicle is an aircraft comprising an image-capture device mounted to the aircraft and configured to capture images or a video of an external environment of the aircraft, wherein operating the display system in the first state comprises causing the electronic display to display the images or the video captured by the image-capture device.

20. A method of making a simulated window feature in a lavatory of a vehicle, the method comprising:

forming a cutout in a curved wall of the lavatory, wherein the cutout is oval- or oblong-shaped;

installing a bezel about a boundary of the cutout; and installing a display system, such that the display system is visible from within the lavatory, wherein the display system comprises a fixture configured as a continuous member, (iii) and a display mounted in the fixture, wherein the display is flat, wherein the fixture is ring-shaped and has variable thickness such that a top edge and a bottom edge of the fixture are thicker than a middle section of the fixture so as to accommodate curvature of the curved wall of the lavatory.

21. An aircraft comprising:

a lavatory having a curved wall, wherein a cutout is formed in the curved wall of the lavatory;

a bezel disposed about a boundary of the cutout, wherein the bezel is oval- or oblong-shaped to resemble a respective bezel of an aircraft window; and a display system coupled to the bezel, such that the display system is visible from within the lavatory, wherein the display system comprises a fixture configured as a continuous member, (iii) and a display mounted in the fixture, wherein the display is flat, wherein the fixture is ring-shaped and has variable thickness such that a top edge and a bottom edge of the fixture are thicker than a middle section of the fixture so as to accommodate curvature of the curved wall of the lavatory.

* * * * *